UNITED STATES PATENT OFFICE.

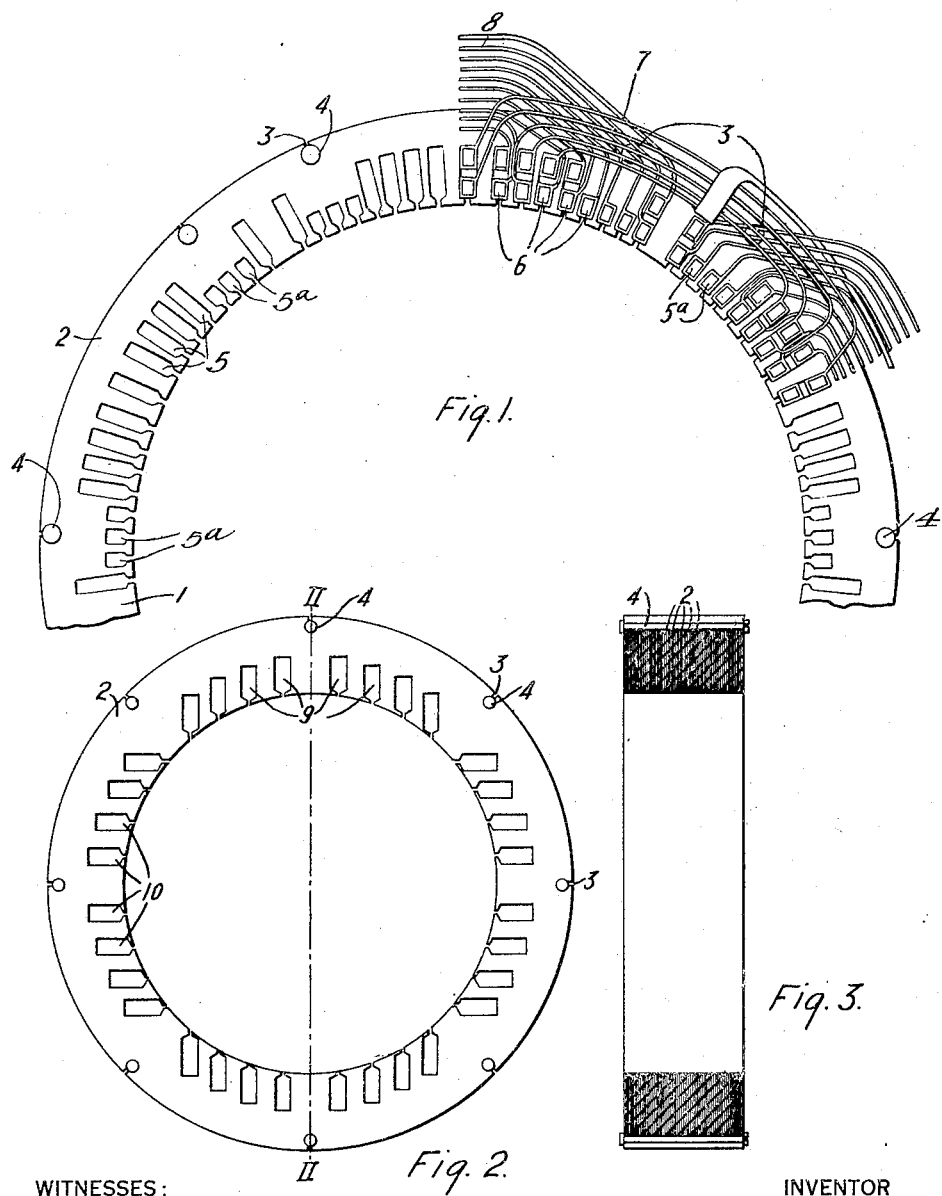

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,326,340.         Specification of Letters Patent.      Patented Dec. 30, 1919.

Application filed June 19, 1915. Serial No. 35,167.

*To all whom it may concern:*

Be it known that I, RUDOLF E. HELLMUND, a citizen of the United States, and a resident of Pittsburgh, in the county of Allegheny and State of Pennsylvania, have invented a new and useful Improvement in Dynamo-Electric Machines, of which the following is a specification.

My invention relates to dynamo electric machines and particularly to the construction of magnetizable core members for such machines.

The object of my invention is to provide a magnetizable core member wherein particularly desirable magnetic conditions may be obtained in combination with reliable mechanical construction.

In the design and construction of alternating-current motors, particularly of the single-phase commutating type, it has been found necessary to provide magnetizable core members of relatively great mechanical strength in order to withstand the severe stresses set up during the operation of such machines. For this reason, it has been found desirable to secure together the laminations forming the core members by bolts or rivets. With such construction, however, the bolts or rivets extending through the assembled laminations should be insulated from the core structure in order to prevent the eddy currents produced by the magnetic lines of force cutting the rivets, from causing over-heating of the rivets and the surrounding portions of the core member. The insulation of the rivets from the laminations is both difficult and expensive and does not permit of reliable mechanical construction.

According to the present invention, I provide a riveted laminated core-structure, wherein the insulation of the rivets may be entirely omitted and the over-heating due to the circulation of eddy currents reduced to a negligible amount. In order to accomplish this, the current-carrying conductors are so disposed in the core-structure that the density of the magnetic flux below the rivets is reduced to a small value and there is but little tendency for the magnetic lines of force to pass around the rivets.

In the accompanying drawings, Figure 1 is a view, partially in side elevation and partially in section, of a portion of a dynamo electric machine embodying my invention. Fig. 2 is a view, in front elevation, of a magnetizable core member embodying a modification of my invention, and Fig. 3 is a sectional view along the line II—II of Fig. 2.

A magnetizable core member 1 of a dynamo electric machine comprises a plurality of annular laminations 2 that are severally provided with a plurality of outer peripheral openings 3. The openings 3 are in alinement when the laminations 2 are assembled and are adapted to receive elemental tension members 4 which may be secured within the openings 3 in any suitable manner. The laminations 2 are further provided with radial slots 5, which are adapted to receive current-carrying conductors 6 of a suitable main field winding 7 and an auxiliary starting winding 8. A majority of the slots 5 are of such depth that they are adapted to receive two layers of current-carrying conductors 6. Slots $5^a$, however, that are disposed on both sides of radial planes through the axes of the peripheral openings 3, are substantially one-half the depth of the slots 5 and are adapted to receive but one conductor of the winding 8.

As shown in Figs. 2 and 3, the laminations 2 are provided with two groups of parallel slots; the axes of the slots 9 comprising the one group being disposed at right angles to the axes of the slots 10 comprising the second group and one slot in the middle of each group being omitted. The peripheral openings 3 are arranged with their axes in radial planes that bi-sect the several groups and intermediate the same.

With the above described arrangements of slots, it is apparent that the magnetic flux density between the rivets 4 and the current-carrying conductors 6 will be materially less than the flux density between other points along the outer periphery of the core member 1 and the nearest portions of the windings 7 and 8. With such a condition, the number of magnetic lines of force cutting the rivets 4 is reduced to a negligible amount. The reduction of the magnetic-flux density below the rivets is obtained without an increase in the diameter of the laminations forming the magnetizable core member, and, consequently, without any increase in the size and weight of the dynamo electric machine.

While I have shown my invention in a simple and preferred form, it is not so limited and may be as readily applied to other types of machines, and I desire that only such limitation shall be imposed thereon as may come within the scope of the appended claims.

I claim as my invention:

1. In a dynamo-electric machine, the combination with a plurality of annular magnetizable plates provided with peripheral slots and a plurality of current-carrying conductors located in said slots, certain of said slots being of different depth and arranged to produce regions of relatively low magnetic flux density around the periphery of said plates remote from said slots, of rivets located in said regions of low flux density for securing said plates together.

2. In a dynamo-electric machine, a hollow cylindrical core structure comprising laminations joined by elemental tension members of conducting material, said tension members being located adjacent one cylindrical surface of said core structure, the remaining cylindrical surface thereof being provided with spaced winding slots, and the slots adjacent said tension members being of reduced depth, whereby the flux density adjacent said tension members is reduced and the eddy-current effect therein is minimized.

3. In a dynamo-electric machine, a hollow cylindrical core structure comprising laminations joined by elemental tension members of conducting material, said tension members being located in slots in one cylindrical surface of said core structure, the remaining cylindrical surface thereof being provided with spaced winding slots, the slots adjacent said tension members being of reduced depth, whereby the flux density adjacent said tension members is reduced and the eddy-current effect therein is minimized.

In testimony whereof, I have hereunto subscribed my name this 12th day of June, 1915.

RUDOLF E. HELLMUND.